3,382,037
PROCESS FOR THE PRODUCTION OF SODIUM TRIMETAPHOSPHATE

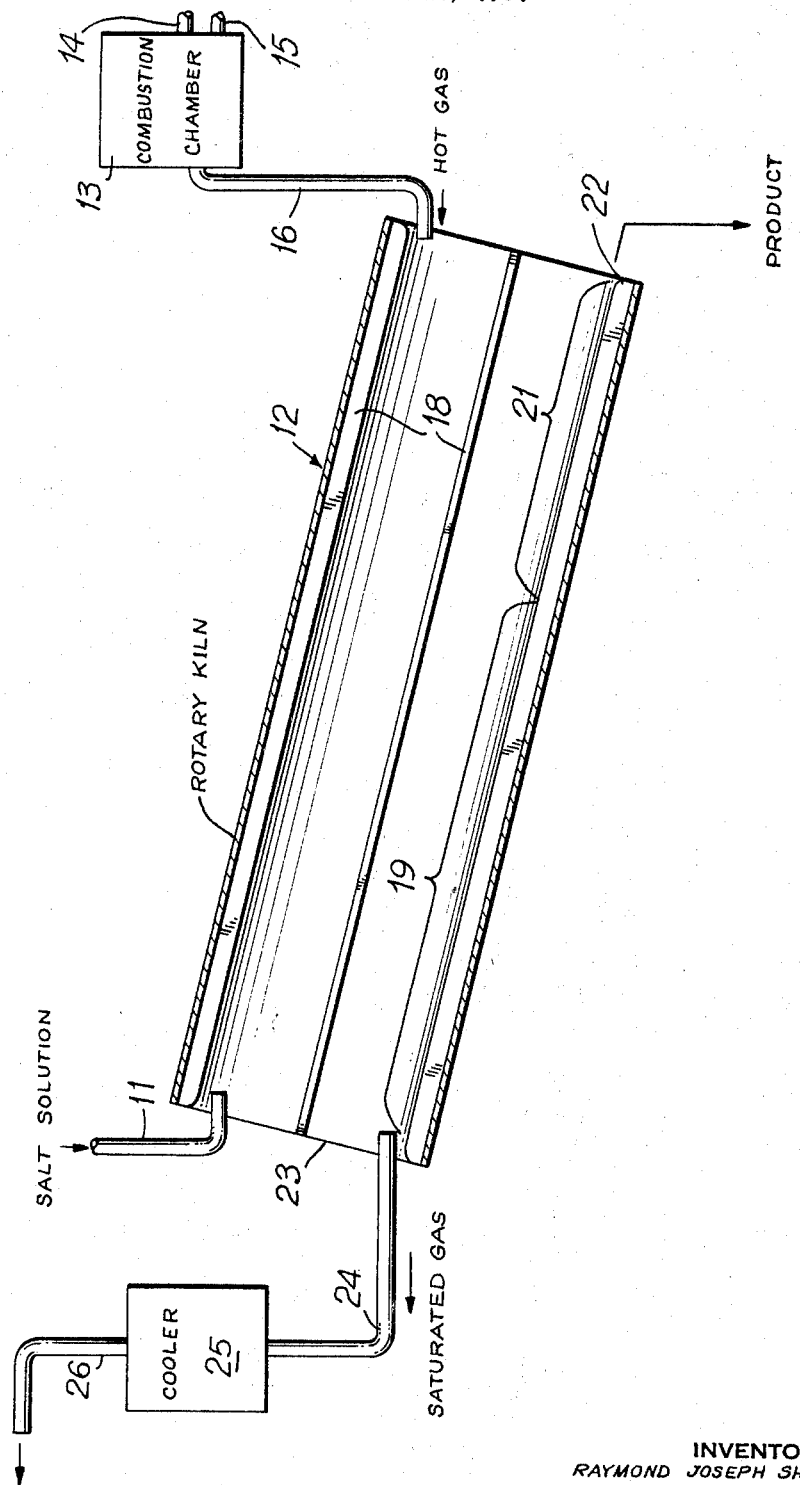

Raymond Joseph Shaffery, Middletown, Jerome Strumpf, Colonia, and Bernard Peter Leber, New Monmouth, N.J., assignors to FMC Corporation, New York, N.Y., a corporation of Delaware
Filed Dec. 29, 1964, Ser. No. 421,908
2 Claims. (Cl. 23—106)

ABSTRACT OF THE DISCLOSURE

Sodium trimetaphosphate containing less than 0.5% by weight of water insolubles is produced by: (a) continuously feeding an aqueous solution of sodium phosphate having a molar $Na_2O/P_2O_5$ ratio of from 0.99 to 1.00 through an elongated reaction zone at a rate sufficient to give a total residence time of about three hours; (b) continuously introducing combustion gases at a temperature of from about 800 to 850° C. countercurrent to and in intimate contact with the sodium phosphate solution; and (c) continuously removing a sodium trimetaphosphate product having no more than 0.5% water insolubles at a temperature of from 520 to 580° C. from said elongated reaction zone.

---

This invention relates to a process for the production of sodium trimetaphosphate, and more particularly to such process for producing sodium trimetaphosphate containing minimum quantities of water-insolubles.

In this specification, all parts and percentages are given by weight, unless otherwise indicated.

For many applications of sodium trimetaphosphate, as for example in the detergent field, a product substantially free, i.e., contains less than about 0.5% by weight, of water-insolubles is desired. Also desirable is a product containing low levels of other phosphates, desirably below about 4%. Conventional calcination procedures for converting monosodium orthophosphate and/or sodium acid pyrophosphate to sodium trimetaphosphate, however, commonly produce a product containing undesirably large quantities, e.g., more than about 1%, of water-insolubles. In accordance with such techniques, sodium trimetaphosphate products containing low levels of water-insolubles are produced by "soaking" the reaction materials at temperatures of from about 450° C. to about 600° C. for periods of about 48 hours or longer. Such prolonged reaction times are, of course, objectionable for commercial practice.

Proposals have been made to decrease the reaction times of such calcination techniques, including the use of "accelerators" comprising mineral polyphosphates, and the use of high heating rates, involving raising the temperature of the material to be calcined at rates of 175° C. per minute or higher. Such procedures are relatively costly to carry out and otherwise objectionable.

Another procedure for producing sodium trimetaphosphate products, described in French Patent 1,349,989 of October 14, 1963, involves the calcination of a mixture of sodium phosphate salts having a molar $Na_2O/P_2O_5$ ratio within the narrow range of from 1.03 to 1.12. The patent indicates that, employing such a reaction mixture, sodium trimetaphosphate containing as low as 0.04% insolubles can be produced in about 1 hour of calcination at 500° C. whereas the calcination of monosodium orthophosphate (having an $Na_2O/P_2O_5$ ratio of 1.00) at 500° C. for 1 hour results in a product containing more than 32 times this quantity of water-insolubles. This French patent further discloses that the product contains from about 7% to 22% of contaminating sodium tripolyphosphate.

It is a principal object of the present invention to provide a process, involving relatively short reaction times and which can be carried out economically, for the production of sodium trimetaphosphate in substantially pure form, i.e., containing less than about 0.5% water-insolubles and less than about 4% sodium tripolyphosphates.

Other objects and advantages of this invention will be apparent from the following detailed description, taken in connection with the accompanying drawing showing a schematic view, partially in section, of a preferred arrangement of equipment for practicing the process of this invention.

In accordance with the invention, substantially pure sodium trimetaphosphate is produced by continuously feeding an aqueous solution of a sodium phosphate, or a mixture of sodium phosphates, preferably monosodium phosphate, having a molar $Na_2O/P_2O_5$ ratio of from 0.99 to 1.00, a temperature of from about 100° C. to about 110° C. and containing from 70% to 73% sodium phosphate and gaseous products of combustion at a temperature of from 800° C. to 850° C., generally longitudinally through an elongated reaction zone, countercurrent to and in intimate contact with one another for a residence time of about three hours of which about two-thirds represents the time for complete removal of water and the remainder represents the calcination residence period, and continuously removing the calcined product at a temperature of from about 520° C. to about 580° C. from the discharge end of the calcination zone. The volume of combustion gases thus passed in direct and intimate contact with first the dried product and then the aqueous solution is such as to effect the complete removal of water and impart to the exit product a temperature of from about 520° C. to about 580° C. By introducing the combustion gases at a temperature of from about 800° C. to about 850° C. and using a volume proportioned to the amount of solution introduced into the drying zone, the calcined product is discharged at a temperature of about 520° C. to about 580° C. The sodium trimetaphosphate product thus produced contains less than about 0.5% of water-insolubles and less than about 4% of sodium tripolyphosphates.

While the explanation for the unexpected obtainment of a high purity sodium trimetaphosphate by the process of this invention is not fully understood, it has been demonstrated by the practice of this process that the removal of water from an aqueous solution having a concentration of from about 70% to about 73% of sodium phosphate and having an $Na_2O/P_2O_5$ molar ratio of from 0.99 to 1.00 by intimate contact with combustion gases leaving the calcination zone into which these gases are introduced at a temperature of from about 800° C. to about 850° C. for a residence time in the water removal zone of about 2 hours followed by the maintenance of the dry material in the calcination zone for about 1 hour in intimate contact with the combustion gases entering this calcination zone at a temperature of from about 800° C. to about 850° C. and the removal of the calcined product at a temperature of from about 520° C. to about 580° C., surprisingly results in the production of a substantially pure product containing less than about 0.5% of water-insolubles and less than about 4% of sodium tripolyphosphates. In order for the aqueous solution to have the desired concentration of from about 70% to about 73% of sodium phosphate it is preheated to a temperature of from about 100° C. to about 110° C.

The aqueous solution of a sodium phosphate, having a molar $Na_2O/P_2O_5$ ratio of from 0.99 to 1.00, a temperature of from about 100° C. to about 110° C. and a concentration of from 70% to 73% is introduced into the reactor. Preferably, the solute is monosodium orthophosphate prepared, for example, by reacting soda ash with phosphoric acid.

The combustion gases introduced into the reactor, at the product exit end thereof, should be at a temperature of from about 800° C. to 850° C. Combustible gases produced by the combustion of any fuel, solid, liquid or gaseous can be used; such gases are composed chiefly of carbon dioxide, carbon monoxide and nitrogen. Flue or other waste inert industrial gases, if available, at the disclosed temperature can be used. The volume of gas passed through the reaction is correlated with the amount of solution passing therethrough countercurrently in intimate contact first with the dry sodium phosphate to calcine and produce the sodium metaphosphate at a temperature of from about 520° C. to about 580° C. at the exit end of the calciner and thereafter in contact with the liquid feed to remove the water therefrom and exit from the reaction zone saturated with water at a temperature of about 100° C. In general the introduction of from 190 to 230 cubic feet of combustion gases at the disclosed temperature per pound of solution fed into the reaction zone gives a product of the desired high purity. The saturated gas leaving the reaction zone can be cooled and the condensable separated therefrom, prior to the venting of the residual gas.

It is important that the product removed from the exit end of the reaction zone be at a temperature of from about 520° C. to about 580° C. This refers to the temperature of the sodium trimetaphosphate and not the temperature in the reaction zone at the product exit end thereof. As noted, the temperature of the combustion gases entering the product exit end are substantially above this temperature, namely, from about 800° C. to about 850° C. Combustion gases at a temperature of about 800° C. to about 850° C. are readily obtained by controlling the relative amounts of fuel and air to support combustion of the fuel to produce combustion gases at the desired temperature. Regulation of the flow of (a) the phosphate solution and the dry salt produced therefrom is, desirably, effected by controlling the rate of rotation and the pitch of the rotary kiln, constituting the reaction zone to obtain the desired rate of flow of (a). Regulation of the flow rate of (b) the combustion gases through the reaction zone is effected chiefly by regulation of the pressure at which the combustion gases are introduced into the reaction zone.

By (1) introducing the combustion gases at a temperature of from about 800° C. to about 850° C., (2) regulating the volume of these gases proportional to the volume of solution of sodium phosphate having a concentration of from about 70% to about 73% introduced at the opposite end of the reaction zone at a temperature of about 100° C. to about 110° C. (at which temperature the aqueous solution contains the disclosed high concentration of sodium phosphate), and (3) regulating the countercurrent flow of (a) the phosphate solution and the dry salt produced therefrom and (b) the combustion gas through the reaction zone so that the total residence time of (a) is about 3 hours, the sodium trimetaphosphate product is discharged at the exit end at a temperature of from about 520° C. to about 580° C. and contains less than about 0.5% water-insolubles and less than about 4% sodium tripolyphosphates. When the product is discharged at temperatures below about 500° C. or above about 580° C. the desired high purity, with particular reference to low water-insoluble content and low content sodium tripolyphosphates, is not obtained.

In the practice of the process in the apparatus schematically illustrated in the accompanying drawing, a concentrated monosodium orthophosphate salt solution at a temperature of from about 100° C. to about 110° C., and containing from about 70% to about 73% of this salt is introduced through conduit 11 into one end of a rotary kiln 12 and flows therethrough countercurrent to hot combustion gases. These gases, for example, can be generated in a combustion chamber 13 having a fuel line 14, which can be oil, or fuel gas and an air line 15 to supply air to support combustion of the fuel. The supply of fuel to combustion chamber 13 is regulated by conventional controls to produce a stream of combustion gases at a temperature of from about 800° C. to about 850° C. These gases flow through line 16 into rotary kiln 12 provided with suitable baffles 18 to promote thorough mixing of the two streams fed therethrough. Drying of the phosphate salt is effected in region 19 constituting substantially two-thirds the length of the kiln or reaction zone while calcination of the dried material is effected in region 21 extending for approximately one-third the length of the kiln or reaction zone.

The sodium trimetaphosphate product is discharged continuously from product discharge end 22. The saturated gas stream is discharged continuously from the opposite end 23 of the kiln through a conduit 24, flows through a cooler 25, where condensables are condensed and the residual gas vented through line 26.

The following example is given to illustrate a preferred practice of the process of this invention, without limiting the invention thereto. This example was carried out in equipment of the type shown in the drawing.

Monosodium orthophosphate liquor of 59° Baumé concentration, containing 72% salt and having an $Na_2O/P_2O_5$ ratio of 1.00, at a temperature of 110° C. was introduced into kiln 12 from conduit 11 at a rate of 220 gallons/hr. Combustion gases at a temperature of 800–850° C. were introduced into end 22 of kiln 12 and passed at a rate of 15 cu. ft. per hour. The hot gas flowed first in intimate contact with and countercurrent to the dried salt in zone 21 and the thus cooled gas from zone 21 flowed through zone 19 in intimate contact with and countercurrent to the solution introduced at end 23 and the salt resulting from the removal of water from the solution. The total residence time within the kiln 12 was 3 hours; about 2 hours was required for flow through the drying zone 19 and 1 hour for flow through calcining zone 21.

Analysis of fractions of the product showed that it contained from 0.05 to 0.45% water-insolubles, from 0.0 to 0.1% monosodium orthophosphate, from 0.5 to 0.8% sodium pyrophosphate, from 1.2 to 2.7% sodium tripolyphosphate and, by difference, from 96.5 to 98.7% sodium trimetaphosphate. These analyses were made by conventional techniques; the analysis for water-insolubles was made at room temperature (20° C.).

It will be apparent that various changes can be made in the process described hereinabove, without departing from the scope of this invention. Accordingly, it is intended that the preceding description be interpreted as illustrative and not in a limiting sense.

What is claimed is:

1. A process for the production of sodium trimetaphosphate containing less than about 0.5% by weight of water-insolubles, which comprises:
    (a) continuously feeding an aqueous solution of sodium phosphate having a molar $Na_2O/P_2O_5$ ratio of from 0.99 to 1.00 and containing from 70% to 73% by weight of sodium phosphate through an elongated reaction zone at a rate such that the total residence time of the sodium phosphate in said reaction zone is about three hours:
    (b) continuously feeding combustion gases at a temperature of from 800° C. to 850° C. through said zone in intimate contact with and countercurrent to said solution; and
    (c) continuously removing the calcined sodium trimetaphosphate product at a temperature of from 520° C. to 580° C. from the reaction zone.

2. A process for the production of substantially pure sodium trimetaphosphate containing less than about 0.5% by weight of insoluble metaphosphates and less than 4% by weight of sodium tripolyphosphate, which comprises:

(a) continuously feeding a first stream consisting essentially of an aqueous solution at a temperature of from 100° C. to 110° C. containing from 70% to 73% by weight of monosodium orthophosphate and having a molar $Na_2O/P_2O_5$ ratio of from 0.99 to 1.00, longitudinally through an elongated reaction zone;

(b) continuously introducing a stream of combustion gases at an inlet temperature of from 800° C. to 850° C. at the product exit end of said zone, passing said stream of combustion gases longitudinally through said zone in intimate contact with and countercurrent to said first stream, and continuously withdrawing said second stream at a temperature of about 100° C. from said reaction zone where the first stream is introduced;

(c) maintaining said first stream within the reaction zone for a period of about 3 hours to initially dry and then calcine the monosodium orthophosphate therein to produce sodium trimetaphosphate, the calcination being effected for about one-third the residence time of said stream in the reaction zone; and (d) continuously removing calcined sodium trimetaphosphate containing less than about 0.5% by weight of water-insolubles and less than about 4% by weight of sodium tripolyphosphate at a temperature of from 520° C. to 580° C. from the reaction zone.

References Cited

UNITED STATES PATENTS

| | | | |
|---|---|---|---|
| 3,230,039 | 1/1966 | Metcalf et al. | 23—106 |
| 3,230,040 | 1/1966 | Metcalf et al. | 23—106 |
| 3,314,750 | 4/1967 | Shen | 23—106 |

OSCAR R. VERTIZ, *Primary Examiner.*

L. A. MARSH, *Assistant Examiner.*

UNITED STATES PATENT OFFICE
CERTIFICATE OF CORRECTION

Patent No. 3,382,037                                  May 7, 1968

Raymond Joseph Shaffery et al.

It is certified that error appears in the above identified patent and that said Letters Patent are hereby corrected as shown below:

Column 1, line 60, "1,349,989" should read -- 1,343,989 --.
Column 3, line 25, "condensable" should read -- condensables --; line 64, "500° C." should read -- 520° C. --.

Signed and sealed this 2nd day of December 1969.

(SEAL)

Attest:

Edward M. Fletcher, Jr.
Attesting Officer

WILLIAM E. SCHUYLER, JR.
Commissioner of Patents